UNITED STATES PATENT OFFICE.

JONAS W. AYLSWORTH, OF EAST ORANGE, NEW JERSEY, ASSIGNOR, BY DIRECT AND MESNE ASSIGNMENTS, TO CONDENSITE COMPANY OF AMERICA, OF EAST ORANGE, NEW JERSEY, A CORPORATION OF NEW JERSEY.

CEMENT FOR PIPE CONNECTIONS, &c.

1,065,495. Specification of Letters Patent. Patented June 24, 1913.

No Drawing. Application filed February 11, 1910. Serial No. 543,237.

*To all whom it may concern:*

Be it known that I, JONAS W. AYLSWORTH, a citizen of the United States, and a resident of East Orange, in the county of Essex and State of New Jersey, have invented certain new and useful Improvements in Cement for Pipe Connections, &c., of which the following is a description.

My invention relates to a cement suitable for pipe connections and other uses, and my object is to produce a more or less fluid or plastic composition for applying to threaded and flanged joints in metal pipes for conveying steam, water, oils, gases, chemicals, etc.

My invention comprises the combination of a phenol resin, such as described in my application Serial No. 496,060, filed May 14, 1909, and also described in my Patents Numbers 1,020,593, granted March 19, 1912, and 1,029,737, granted June 18, 1912, together with a small percentage of a solvent for the same and a small percentage of a methylene-amin compound, such as hexa-methylene-tetra-amin and a suitable mineral filling material, such as finely divided clay, barytes, lead sulfate or chlorid, lamp black, graphite, bronze powders, talc, powdered mica, etc. The composition is designed to harden by the application of a moderate heat to form a hard infusible cement to prevent leaks in the joints of pipes, and for similar uses. The phenol resin is a fusible condensation product of phenol and formaldehyde, which is changed by reaction with the methylene radical of the methylene-amin compound into a hard infusible ultimate condensation product, as is described in my Patent No. 1,020,593, above referred to, this final reaction being unaccompanied by the evolution of gas and without the necessity for the employment of a counteracting pressure.

In the specification and claims, the term "phenol" is to be understood as including the homologues and other equivalents of phenol, such as cresol, and the term "formaldehyde" is to be understood as including the polymers of formaldehyde.

The following composition serves to illustrate a representative formula of the character described: 100 parts by weight of phenol resin or other fusible condensation product of phenol capable of being hardened by hexa-methylene-tetra-amin dissolved in 100 parts by weight of a solvent for the same, such as alcohol or equivalent volatile solvent. 20 to 50 parts of a normally non-volatile solvent for the same, such as mono-chloro-naphthalene, glycerin, castor oil, or any of the solvents mentioned in my application Serial No. 496,060. The solvents mentioned in application Ser. No. 496,060, as there described are termed "final product solvents" by which term are included only such substances as will dissolve the ultimate condensation product or combine therewith at the baking temperature, render it plastic at such temperature, and remain as a part of the product in the condition of solid solution, both when the ultimate product is hot and when it is cold. Among the examples of this class which may be mentioned are naphthalene and some of its derivatives, such as nitro and chloro derivatives, especially the mono-nitro and di-nitro and mono-chloro and tetra-chloro naphthalenes, di-nitro benzene, preferably the meta variety, acetanilid, ricinoleic acid and ricinelaidic acid and their anhydrids, benzoic acid and anhydrid, and di-phenylamin. 7 to 11 parts of hexa-methylene-tetra-amin or equivalent methylene-amin. 50 to 300 parts of finely divided inert filler, which may preferably be of such nature that the joined surfaces may be separated readily when desired, such as graphite, powdered mica, talc, bronze powders, etc. The non-volatile solvent ingredient may be of the liquid type, when it is desired to have the composition remain a viscid fluid, and various proportions of alcohol may be added to thin the same according to requirements. Or the non-volatile solvent may be omitted and the material rendered sufficiently fluid by the alcohol alone; or again, the alcohol may be omitted and the non-volatile solvent alone used when it is desired to apply the cement as a thick non-drying paste, which will harden by heat. The alcohol or other equivalent volatile solvent, if the same is used, is readily volatile and is practically all driven off during the heating by which the composition is hardened, as stated. The normally non-volatile solvent remains largely or wholly within the mass after heating and hardening, as a desirable ingredient, as stated.

The mono-chloro-naphthalene mentioned by me as the first example of a desirable normally non-volatile solvent of the liquid type, is a liquid, the boiling point of which is much higher than that of water, or the temperature at which the hardening reaction of the composition takes place. The mono-chloro-naphthalene is a substance which is practically insoluble in water, but dissolves in, and is a solvent for the phenol resin, in the proportions given. The phenol resin preferably employed, as described in my application and patent referred to, is anhydrous, as is also the hexa-methylene-tetra-amin, so that the only water in the composition is that contained in the alcohol or other readily volatile solvent, if the latter is used, which water is driven off with the alcohol upon drying or hardening. The absence of water in the hardened mass makes a stronger and better composition.

It is to be understood that my invention is not limited to the conjoint use of all the ingredients mentioned in the illustrative example given, but is as broad as is indicated by the appended claims.

Having now described my invention, what I claim and desire to protect by Letters Patent is as follows:

1. A cement comprising a mixture of a fusible resin of phenolic origin, a non-volatile fluid solvent of the same, an inert filling material, and hexa-methylene-tetra-amin, substantially as described.

2. A cement comprising a mixture of a fusible resin of phenolic origin containing no free formaldehyde, a substance which combines with the same on application of heat to harden it, an inert filling material in the proportion of at least 50 per cent. of the said resin, and a normally non-volatile organic liquid solvent for the said resin and substance, the boiling point of which exceeds the reaction hardening temperature of said resin and substance, substantially as described.

3. A cement comprising a mixture of a fusible resin of phenolic origin containing no free formaldehyde, a substance which combines with the same on application of heat to harden it, an inert filling material in the proportion of at least 50 per cent. of the said resin, and a non-volatile fluid solvent for the resin, substantially as described.

4. A cement comprising a mixture of substantially 100 parts by weight of phenol resin, 100 parts of a volatile solvent, 20 to 50 parts of a normally non-volatile fluid solvent, 7 to 11 parts of hexa-methylene-amin, and 50 to 300 parts of a finely divided inert filler, substantially as described.

5. A cement composition comprising substances capable of transformation by chemical reaction upon application of sufficient heat to form a hard infusible phenolic condensation product, and a solvent therefor, said solvent containing a readily volatile organic liquid and another organic liquid which is immiscible with water and whose boiling point exceeds that of water, substantially as described.

6. A cement composition comprising substances capable of transformation by chemical reaction upon application of sufficient heat to form a hard infusible phenolic condensation product, and a solvent therefor, said solvent containing a readily volatile organic liquid and liquid mono-chloro-naphthalene in proportion to act as a solvent for said substances, substantially as described.

7. A cement composition comprising substances capable of transformation by chemical reaction upon application of sufficient heat to form a hard infusible phenolic condensation product, and a solvent therefor, said solvent comprising liquid mono-chloro-naphthalene, substantially as described.

8. A cement composition comprising substances capable of transformation by chemical reaction upon application of sufficient heat to form a hard infusible phenolic condensation product, and a solvent therefor, said solvent comprising an organic liquid which is immiscible with water, and of which the boiling point exceeds that of water, and also exceeds the temperature at which the said substances react to form a hard infusible phenolic condensation product as aforesaid, substantially as described.

9. A cement composition comprising substances capable of transformation by chemical reaction upon application of sufficient heat to form a hard infusible phenolic condensation product, and a solvent therefor, said solvent containing a readily volatile organic liquid and another organic liquid which is immiscible with water and of which the boiling point exceeds that of water, and also exceeds the temperature at which the said substances react to form a hard infusible phenolic condensation product as aforesaid, and an inert filling material in finely divided condition, substantially as described.

10. A cement composition comprising a phenol resin, a methylene-containing hardening agent therefor and an organic liquid of which the boiling point exceeds that of water and also exceeds the reaction hardening temperature of said resin and hardening agent, the said liquid being a solvent for said resin and being immiscible with water, substantially as described.

11. A cement composition comprising a phenol resin, a methylene-containing hardening agent therefor, and a solvent therefor comprising liquid mono-chloro-naphthalene, substantially as described.

This specification signed and witnessed this 8th day of February 1910.

JONAS W. AYLSWORTH.

Witnesses:
DYER SMITH,
JOHN M. CANFIELD.